(12) United States Patent
Maiti et al.

(10) Patent No.: US 9,540,248 B2
(45) Date of Patent: Jan. 10, 2017

(54) SELECTIVE EXTRACTION OF POTASSIUM CHLORIDE EMPLOYING TARTARIC ACID AS SAFE, BENIGN AND RECYCLABLE EXTRACTANT

(71) Applicant: Council of Scientific & Industrial Research, New Delhi (IN)

(72) Inventors: Pratyush Maiti, Bhavnagar (IN);
Pushpito K. Ghosh, Bhavnagar (IN);
Krishna K. Ghara, Bhavnagar (IN);
Jignesh Solanki, Bhavnagar (IN);
Harshad R. Brahmbhatt, Bhavnagar (IN); Jatin R. Chunawala, Bhavnagar (IN); Suresh Eringathodi, Bhavnagar (IN); Parimal Paul, Bhavnagar (IN)

(73) Assignee: Council of Scientific & Industrial Research (IN)

( * ) Notice: Subject to any disclaimer, the term of this patent is extended or adjusted under 35 U.S.C. 154(b) by 260 days.

(21) Appl. No.: 14/379,215

(22) PCT Filed: Apr. 2, 2013

(86) PCT No.: PCT/IB2013/000582
§ 371 (c)(1),
(2) Date: Aug. 15, 2014

(87) PCT Pub. No.: WO2013/150363
PCT Pub. Date: Oct. 10, 2013

(65) Prior Publication Data
US 2015/0010448 A1 Jan. 8, 2015

(30) Foreign Application Priority Data
Apr. 2, 2012 (IN) .......................... 0606/DEL/2012

(51) Int. Cl.
C22B 26/10 (2006.01)
C01D 3/08 (2006.01)
C01D 3/06 (2006.01)

(52) U.S. Cl.
CPC . *C01D 3/08* (2013.01); *C01D 3/06* (2013.01); *C22B 26/10* (2013.01)

(58) Field of Classification Search
None
See application file for complete search history.

(56) References Cited

U.S. PATENT DOCUMENTS 2,617,710 A 11/1952 Kielland et al.
2,710,789 A 6/1955 Boeri
7,041,268 B2 5/2006 Ghosh et al.

FOREIGN PATENT DOCUMENTS

DE 694480 8/1940
DE 694480 C 8/1940
(Continued)

*Primary Examiner* — Melissa Swain
(74) *Attorney, Agent, or Firm* — Blank Rome LLP

(57) ABSTRACT

Although U.S. Pat. No. 8,182,784 teaches the recovery of potassium chloride from schoenite end liquor (SEL) using dipicrylamine as extractant, and consequently simplifies the recovery of sulphate of potash (SOP) from kainite mixed salt employing the scheme disclosed in U.S. Pat. No. 7,041,268, the hazards associated with this extractant have thwarted practical utilization of the invention. Many other extractants for potash recovery have been disclosed in the prior art but none has been found suitable so far for practical exploitation. It is disclosed herein that the bitartrate ion, and particularly L-bitartrate, precipitates out potassium bitartrate very efficiently from SEL with ca. 90% utilization of the extractant. In contrast, recovery of potassium bi-tartrate from sea bittern directly is relatively much lower. It is further disclosed that this precipitate can be treated with magnesium hydroxide and magnesium chloride to throw out (Continued)

magnesium tartrate with ca. 90% recovery while yielding a nearly saturated solution of potassium chloride which can be utilized for the reaction with schoenite to obtain SOP. It is further demonstrated that the magnesium tartrate can be treated with an appropriate amount of aqueous HCl and added into a subsequent batch of SEL to throw out potassium bitartrate once again which demonstrates the recyclability of the extractant. The overall loss of tartrate over a cycle was ca. 20% but the dissolved tartrate remaining in the K-depleted SEL and KCl solutions can be precipitated out as calcium tartrate from which tartaric acid can be recovered by known methods, curtailing thereby the loss of tartaric acid per kg of KCl to <5 g. It is also demonstrated that through a similar approach, seaweed sap containing ca. 4% KCl can be concentrated to 20-22% KCl, with excellent utilization efficiency of tartaric acid, and this solution can similarly be utilized for SOP preparation. Potassium salts bearing other anions such as sulphate, nitrate, phosphate and carbonate can also be prepared from the isolated potassium bitartrate.

15 Claims, 2 Drawing Sheets

(56) References Cited

FOREIGN PATENT DOCUMENTS

| WO | WO/2007/054953 | 5/2007 |
| WO | WO-2007054953 A1 | 5/2007 |
| WO | WO/2008/020457 | 2/2008 |
| WO | WO-2008020457 A1 | 2/2008 |

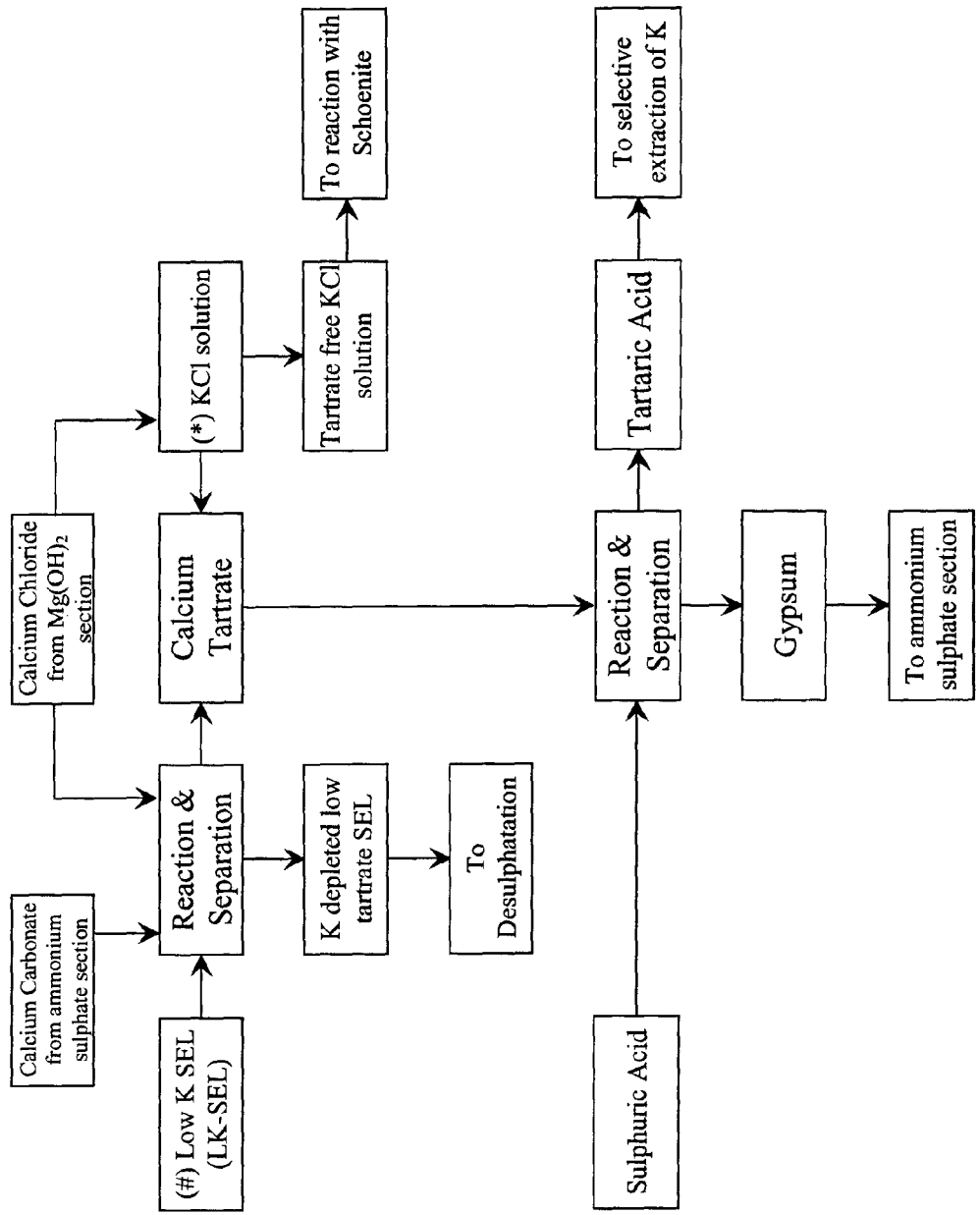

SELECTIVE EXTRACTION OF POTASSIUM CHLORIDE EMPLOYING TARTARIC ACID AS SAFE, BENIGN AND RECYCLABLE EXTRACTANT

This application is a U.S. National Phase of PCT PCT/IB2013/000582, filed Apr. 2, 2013, which claims the priority of Indian Application No. 0606/DEL/2012, filed Apr. 2, 2012, the content of each of which is incorporated by reference herein.

FIELD OF THE INVENTION

The present invention provides safe and efficient extraction process for the recovery of near saturated solution of KCl, free of impurities useful for production of sulphate of potash (SOP) and ammonium sulphate using bittern, ammonia & hydrochloric acid as raw materials and employing tartaric acid as the safe, benign, recyclable & selective extractant for recovery of potassium from intermediate process stream. More particularly, the invention eliminates the need for natural/solar evaporation of intermediate streams for recovery of potassium chloride and thereby reduces dependency on seasonal weather variations & land resources. Further the present invention derives beneficial synergies and advantages of integrated approach of the process.

BACKGROUND AND PRIOR ART OF THE INVENTION

Potassium bearing aqueous solutions, viz., sea bittern left after recovery of common salt in solar salt work is a rich source of the element (20-25 g/lit potassium chloride). Similarly, the natural bittern of Greater Rann of Kutchh (Gujarat, India) is a perennial source of potassium. Evaporite based technologies rely on solar evaporation of bittern and require large amount of land area apart from favourable climatic conditions for consistent production of the potassic feedstock.

Reference may be made to U.S. Pat. No. 7,041,268, May 9, 2006 by Ghosh P. K. et al. which teaches about an integrated process for the recovery of sulphate of potash (SOP) from sulphate rich bittern. However, this process depends on evaporation of intermediate streams for production of potassium chloride, required in the process. This creates additional demand for large amount of land area apart from need effective integration of plant & field operations.

Selective extraction of potassium offers a practical & implementable alternative to overcome the afore-mentioned impediments faced by evaporite based technologies.

Reference may be made to U.S. Pat. No. 2,617,710, Nov. 11, 1952 by Kielland J. et al. which teaches an efficient method for extraction of potassium from dilute solution, e.g., sea water, using dipicryl amine as extractant. However, commercial implementation of the process poses serious operational & environmental issues owing to hazardous nature of dipicryl amine.

Reference may be made to U.S. Pat. No. 8,182,784, May 22, 2012 by Paul P. et al. which teaches an efficient method for extraction of potassium from SEL, the potassium rich intermediate stream generated upon decomposition of kainite type mixed salt, as described in U.S. Pat. No. 7,041,268, in the form of potassium chloride, using dipicryl amine as extractant. However, in this instance also, commercial implementation of the process poses serious operational & environmental issues owing to hazardous nature of dipicryl amine.

Thus a need was felt to devise a process to selectively extract potassium from bittern & other K bearing aqueous solutions for production of potassic fertiliser using a recyclable, benign & environmentally safe extractant.

It was quite well known that potassium bitartrate (cream of tartar) has substantially lower solubility than sodium bitartrate. Cream of tartar, a derivative of wine industry attracted lot of attention, particularly in regard to recovery of tartaric acid & potassium salts.

Reference may be made to U.S. Pat. No. 957,295, May 10, 1910 by Alberti A. et al. which teaches about process of recovering potash salts from wine lye (raw cream of tartar).

Reference may be made to U.S. Pat. No. 2,710,789, Jun. 14, 1955 by Boeri G. et al. which teaches about method for preparing substantially pure potassium nitrate from raw tartaric materials.

Reference may be made to U.S. Pat. No. 3,069,230, Dec. 18, 1962 by Pescarolo B. et al. which teaches about process for extracting Tartaric Acid and Potassium in form pure potassium nitrate in the cold from tartaric acid, without the need of previous roasting of the tartaric raw material.

The above mentioned inventions used wine lees (raw cream of tartar—crude potassium bitartrate) as the potash bearing raw material. Moreover, the aforesaid patents do not teach us about recycling of the extractant, i.e., tartaric acid.

Reference may be made to the paper "Adaptation of the bitartrate method for the estimation of potassium in sea bittern" by Shukla, B. K. et. al (http://www.csircentral.net/index.php/record/view/88029) which teaches about the method for estimation of potassium content of bittern, by precipitating potassium as potassium bitartrate. Although developed as a method for analysis, the main disadvantages for practicing this process are that it requires addition of methanol/ethanol, & sodium hydrogen tartrate apart from tartaric acid for precipitation of potassium bitartrate.

OBJECTS OF THE INVENTION

The main object of the invention is to devise a safe and efficient extraction process for the recovery of near saturated KCl solution, free of impurities, from schoenite end liquor (SEL), obtained from the decomposition of kainite mixed salt into schoenite as disclosed in the prior art, thereby eliminating the need for i) evaporation of intermediate process stream, i.e., SEL and ii) downstream processes for recovery of potassium chloride, viz., evaporite harvesting, carnallite decomposition, hot leaching of crude potash etc.

Another object is to selectively precipitate potassium from SEL, as potassium bitartrate, with high recovery efficiency.

Another object is to use tartaric acid and salts thereof as safe, benign and recyclable extractant.

Another object is to take advantage of optically active isomers of tartaric acid to reduce impurity in potassium bitartrate & to enhance recovery of near saturated KCl solution from solid potassium bitartrate.

Another object is to carry out the core process steps at ambient temperature.

Another object is to generate near saturated KCl solution, by reacting potassium bitartrate with magnesium hydroxide & magnesium chloride.

Another object is to reuse the magnesium tartrate, obtained during production of near saturated KCl solution, for subsequent cycles of selective precipitation of potassium from SEL.

Another object is to selectively precipitate potassium from potassium rich aqueous solutions, including but not limited to, bittern, seaweed (*Kappaphycus alvarezii*) sap etc., as potassium bitartrate.

Another object is to minimise tartaric acid loss in the potassium depleted SEL & potassium bitartrate washings by precipitating the same as calcium tartrate, using calcium carbonate, calcium chloride, gypsum etc.

Another object is to minimise tartaric acid impurity in the near saturated KCl solution by precipitating the same as calcium tartrate, using calcium chloride, gypsum etc.

Another object is to reuse the washings of magnesium tartrate in subsequent batches of production of near saturated KCl solution to enhance recovery of potassium chloride in concentrated form.

Another object is to use magnesium chloride rich end bittern, obtained upon complete crystallisation of kainite type mixed salt in course of evaporation of sea bittern, with potassium bitartrate & magnesium hydroxide to produce near saturated KCl solution.

Another object is to use the potassium depleted SEL, after recovery of residual tartaric acid, for production of magnesium hydroxide which in turn will be used in the production of near saturated KCl solution.

Another object is to minimise the need for outsourced calcium carbonate, required in the process for recovery of residual tartaric acid from different process streams, by obtaining the same through integrated production of ammonium sulphate besides SOP.

Another object is to produce multi-nutrient fertilisers as of sulphate of potash & ammonium sulphate.

Another object is to produce desirable potassium salts, viz., potassium chloride, potassium sulphate, potassium nitrate, potassium phosphate, potassium carbonate etc., by reacting the precipitated potassium bitartrate with magnesium hydroxide or magnesium carbonate & appropriate magnesium salts.

BRIEF DESCRIPTION OF THE DRAWINGS

FIG. 2 represents process for recovery of residual tartaric acid from intermediate streams.

SUMMARY OF THE INVENTION

Figure 1:
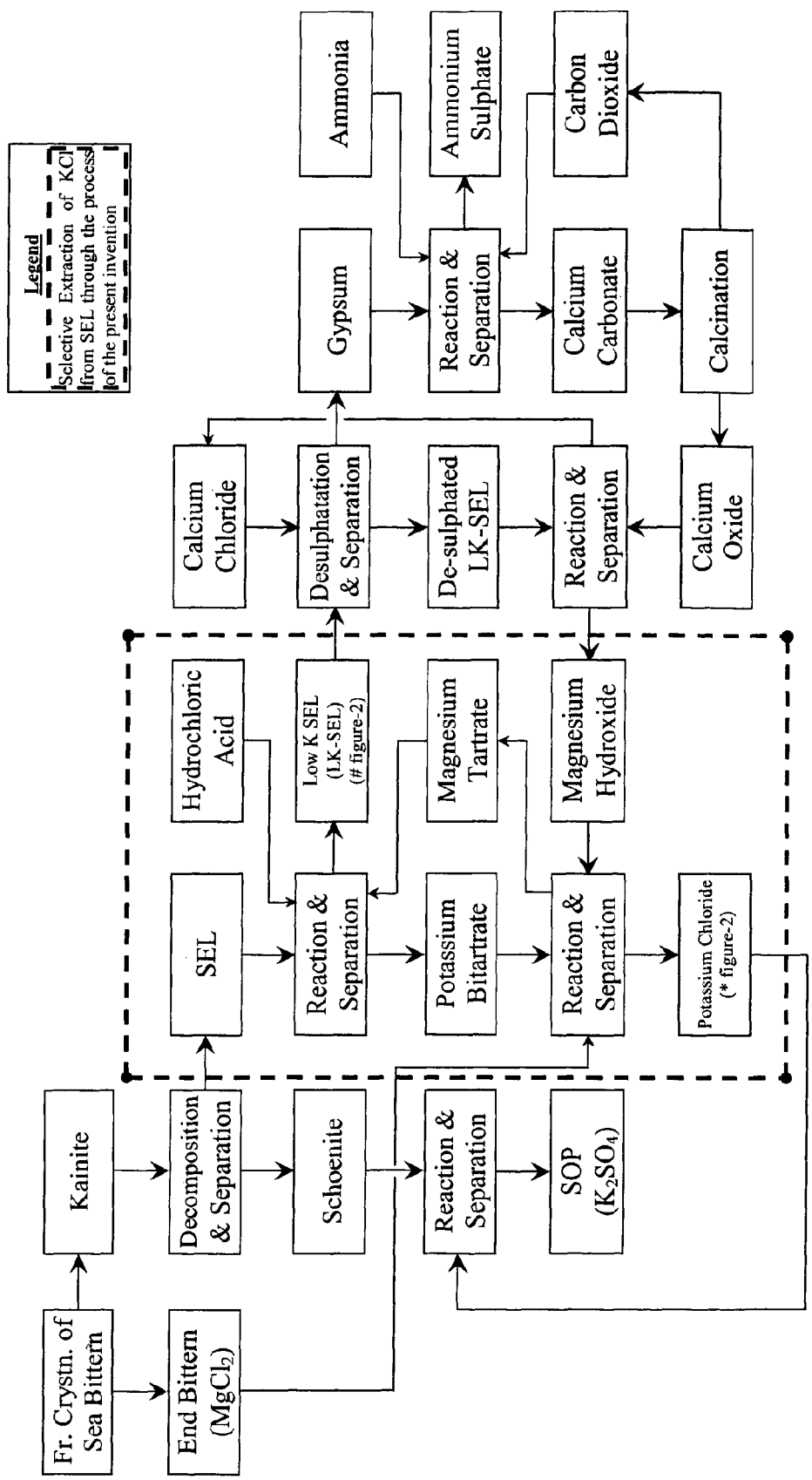
FIG. 1 represents improved process for recovery of sulphate of potash (SOP) from kainite mixed salt with selective extraction of potassium chloride from schoenite end liquor employing tartaric acid as safe, benign and recyclable extractant.

Accordingly, present invention provides a safe and efficient extraction process for the recovery of near saturated solution of potassium chloride (KCl), free of impurities wherein said process comprises the steps of:
i. providing schoenite end liquor (SEL) containing 4.0-5.5% w/v $K^+$ obtained from the decomposition of kainite mixed salt into schoenite by known method; treating schoenite end liquor containing 4.0-5.5% w/v $K^+$ as obtained in step (i) with a sub-stoichiometric amount of tartaric acid half-neutralized with $Mg(OH)_2$, to obtain potassium bi-tartrate and potassium depleted schoenite end liquor;
ii. separating out and washing the precipitated potassium bi-tartrate as obtained in step (ii) with water;
iii. adding the washings into the potassium-depleted schoenite end liquor;
iv. treating the potassium bi-tartrate as obtained in step (iii) with stoichiometric amount of $MgCl_2$ and $Mg(OH)_2$ to convert it into magnesium tartrate while releasing the potassium into solution as near saturated potassium chloride;
v. washing the magnesium tartrate as obtained in step (v) and separately preserving the washing;
vi. treating the K-depleted schoenite end liquor as obtained in step (iv) and the potassium chloride solution obtained in step (v) with calcium carbonate and calcium chloride to precipitate out residual tartaric acid in the form of insoluble calcium tartrate;
vii. adding the magnesium tartrate of step (v) into a fresh lot of schoenite end liquor SEL along with stoichiometric amount of aqueous HCl to once again precipitate out potassium bi-tartrate;
viii. adding the potassium bitartrate from step (viii) into the washing of step (vi) and additional amount of water as required followed by treating with stoichiometric amounts of $MgCl_2$ and $Mg(OH)_2$ to once again precipitate out magnesium tartrate and obtaining once again a near saturated solution of KCl Potassium chloride followed by regenerating tartaric acid from calcium tartrate obtained in step (vii).

In another embodiment of the invention, the tartaric acid is in the racemic or optically active form and preferably in the form of L-isomer.

In another embodiment of the invention, the tartaric acid is in pure form or salt form.

In another embodiment of the invention, the schoenite end liquor containing 4.0-5.5% w/v $K^+$ is treated with a sub-stoichiometric amount of tartaric acid half-neutralized with $Mg(OH)_2$, at a temperature in the range of 20 to 35° C.

In another embodiment of the invention, the amounts of L-tartaric acid and magnesium L-tartrate used in steps (ii) and (viii), respectively, are in the range of 85-95% (molar basis) of the amount of K+ in schoenite end liquor.

In another embodiment of the invention, seaweed sap from *Kappaphycus alvarezi* containing 3.0-4.5% w/v potassium chloride is alternatively used in place of schoenite end liquor to obtain potassium bitartrate with similar efficiency.

In another embodiment of the invention, sea bittern is used in place of schoenite end liquor to obtain potassium bitartrate.

In another embodiment of the invention, recovery of potassium L-bitartrate from sea bittern having 3.25% w/v KCl was only 54-58%, i.e., other constituents in the solution can have a profound influence on recovery and the compositions of SEL and sap are better suited for practice of the invention.

In another embodiment of the invention, recovery of potassium bitartrate was 85-95% on molar basis with respect to L-tartaric acid and magnesium L-tartrate used in steps (ii) and (viii), respectively.

In another embodiment of the invention, recovery of magnesium tartrate with respect to potassium bitartrate was 85-95% in step (v).

In another embodiment of the invention, the washing of magnesium tartrate, contained 7-9% KCl in the case of L-tartaric acid and 14-16% for DL isomer of tartaric acid, indicating more efficient dewatering of the slurry after the reaction of step (v).

In another embodiment of the invention, in step (vii), residual tartaric acid content is reduced to 200-400 ppm.

In another embodiment of the invention, in step (iv), end bittern obtained after recovery of kainite mixed salt is used in place of pure $MgCl_2$.

In another embodiment of the invention, the HCl and $MgO/Mg(OH)_2$ required in steps (ii), (v) and (viii) can be generated from $MgCl_2$ using known methods disclosed in the prior art.

In another embodiment of the invention, $Mg(OH)_2$ required in the process of steps (ii) and (v) can be alternatively generated as part of the integrated processes for sulphate of potash recovery from kainite mixed salt.

In another embodiment of the invention, calcium carbonate required in the process of step (vii) can be obtained from integrated production of sulphate of potash and ammonium sulphate from kainite mixed salt.

In yet another embodiment of the invention, potassium sulphate, potassium nitrate, potassium phosphate or potassium carbonate, are generated in step (v) by using magnesium sulphate, magnesium nitrate, magnesium phosphate or magnesium carbonate respectively in place of $MgCl_2$.

In another embodiment of the invention, the saturated potassium chloride solution produces sulphate of potash on reaction with schoenite.

DETAILED DESCRIPTION OF THE INVENTION

The present invention provides a safe and efficient extraction process for the recovery of near saturated solution of KCl, free of impurities, from schoenite end liquor (SEL) obtained from the decomposition of kainite mixed salt into schoenite as disclosed in the prior art, such process comprising (i) treating SEL containing 4.0-5.5% w/v $K^+$ with a sub-stoichiometric amount of tartaric acid half-neutralized with $Mg(OH)_2$, at room temperature; (ii) separating out and washing the precipitated potassium bi-tartrate with water; (iii) adding the washings into the K-depleted SEL; (iv) treating the potassium bi-tartrate with stoichiometric amount of $MgCl_2$ and $Mg(OH)_2$ to convert it into magnesium tartrate while releasing the potassium into solution as near saturated KCl; (v) washing the magnesium tartrate and separately preserving the washing; (vi) treating the K-depleted SEL obtained in step (iii) and the KCl solution obtained in step (iv) with calcium carbonate and calcium chloride to precipitate out residual tartaric acid in the form of insoluble calcium tartrate; (vii) adding the magnesium tartrate of step (iv) into a fresh lot of SEL along with stoichiometric amount of aqueous HCl to once again precipitate out potassium bi-tartrate; (viii) adding the potassium bitartrate from step (vii) into the washing of step (v) and additional amount of water as required and treating with stoichiometric amounts of $MgCl_2$ and $Mg(OH)_2$ to once again precipitate out magnesium tartrate and obtaining once again a near saturated solution of KCl; (ix) regenerating tartaric acid from calcium tartrate obtained in step (vi) through known prior art; (x) reacting the saturated KCl solution obtained above with schoenite to produce sulphate of potash through the known prior art.

Room temperature varied from 24-26° C.

Compared to the DL isomer, the L-isomer of tartaric acid gave higher recovery of filtrate both during formation of potassium bitartrate and its subsequent decomposition to release KCl and precipitate out magnesium tartrate.

Amounts of L-tartaric acid and magnesium L-tartrate used in steps (i) and (vii), respectively, were 90% (molar basis) of the amount of $K^+$ in SEL.

Seaweed sap containing 3.25% w/v KCl, as obtained from *Kappaphycus alvarezii*, was used in place of SEL resulting in precipitation of potassium bitartrate in 88% efficiency on molar basis with respect to L-tartaric acid.

The yield of potassium L-bitartrate was 55% on molar basis with respect to L-tartaric acid when sea bittern having 3.25% w/v KCl was used.

Recovery of potassium bitartrate was 88% on molar basis with respect to L-tartaric acid and magnesium L-tartrate used in steps (i) and (vii), respectively.

Recovery of magnesium L-tartrate with respect to potassium bitartrate was 88% in step (iv).

Residual tartaric acid content in the potassium-depleted SEL was reduced below 300 ppm in step (vi) and the loss of tartaric acid/kg of KCl obtained was estimated to be 4.28 g.

Residual tartaric acid in the KCl solution remained in the mother liquor during the reaction with schoenite to generate SOP.

End bittern after recovery of kainite mixed salt may be used in place of pure $MgCl_2$ in step (iv).

The HCl and $MgO/Mg(OH)_2$ required in steps (i), (iv) and (vii) can be generated from $MgCl_2$ using known methods disclosed in the prior art.

$Mg(OH)_2$ required in the process of step (i) and (iv) can be generated as part of the integrated processes for sulphate of potash recovery from kainite mixed salt known in the prior art.

Calcium carbonate required in the process of step (vi) can be obtained from integrated production of sulphate of potash and ammonium sulphate from kainite mixed salt.

Other salts of potassium such as potassium sulphate, nitrate, phosphate, carbonate, etc. can be generated in step (iv) by using appropriate magnesium salts in place of $MgCl_2$.

Inventive Steps i. The main inventive step is the finding that whereas recovery of potassium bitartrate is only moderate for even concentrated bittern having 3.5-4.0% w/v KCl, it is remarkably high for the specific systems of interest, namely SEL and seaweed sap, even when such extraction is undertaken under ambient conditions.

ii. Another inventive step is the discovery that potassium bitartrate and magnesium tartrate made from DL (racemic) and L (optically active) tartaric acids do not behave in the same way and the latter is a better choice for easy practice of the invention.

iii. Another inventive step is the transformation of solid potassium bitartrate into solid magnesium tartrate under ambient conditions using benign chemicals such as $MgCl_2$ and $Mg(OH)_2$, with concomitant formation of a nearly saturated KCl solution.

iv. Another inventive step is the recognition that the saturated KCl solution is ideally suited for reaction with schoenite for formation of sulphate of potash, thereby eliminating the need for recovery of KCl in solid form.

v. Another inventive step is the recovery of residual tartaric acid from solutions through precipitation in the form of highly insoluble calcium tartrate and the subsequent regeneration of tartaric acid therefrom through known prior art.

vi. Another inventive step is the recognition that the decomposition of potassium bitartrate can be carried out in a manner that allows one to have access to a wide variety of potassium salts besides potassium chloride.

The following examples are given by way of illustration and therefore should not be construed to limit the scope of the present invention.

Example 1

1 L of SEL [K: 4.83% w/v (1.24 mol), Na: 5.7% w/v (2.48 mol)] was reacted with 167.12 gm (1.11 mol) DL-tartaric acid and 32.5 gm of magnesium hydroxide (0.56 mol) under stirring for 22 hrs at 25±1 °C. The final pH was 1.30. Upon filtration of the resultant slurry, 810 mL filtrate [K=0.20% w/v (0.04 mol)] and a wet solid was obtained, which was washed with 100 mL water & dried to obtain 291 gm of product with 15.46% K and 0.59% Na content.

Example 2

The experiment of Example 1 was repeated except that DL-tartaric acid was replaced with L-tartaric acid. The final pH was 1.26. 910 mL filtrate [K=0.22% w/v (0.05 mol), tartaric acid=2.38% (w/v) (0.14 mol)] and 193 gm of solid containing 22% K and 0.24% Na was obtained. The K content matched reasonably with the expected value of 20.74% K for potassium bitartrate.

Examples 1 and 2 above teach us the method of precipitation of potassium from SEL, as potassium bitartrate, with lower retention of mother liquor, using the combination of L-tartaric acid and Mg(OH)$_2$. The data of Example 2 further indicate that residual tartrate in the filtrate is only 12% of the amount taken even when the reaction is conducted at room temperature (25±1 °C). Further, the observed weight (193 g) of potassium bitartrate matches well with the 88% recovery for which the computed yield is 184 g. This data in combination with the data on K percentage indicate satisfactory purity of the product, the small discrepancy possibly being due to adhering salts which remained after washing.

Example 3

500 mL bittern [K: 1.7% w/v (0.22 mol), Na: 3.4% w/v (0.74 mol)] was reacted with 29.42 gm (0.20 mol) of L-tartaric acid & 5.72 gm of magnesium hydroxide (0.10 mol) under stirring for 18 hrs at 25±1 °C. The final pH was 0.7. Upon filtration of the resultant slurry, 505 mL of filtrate [K=0.55% w/v (0.07 mol)] & wet solid was obtained which was further washed with 50 mL water & dried to produce potassium bitartrate [18.8 gm; K: 22.70% (0.11 mol)].

Example 4

400 mL of sap [K=1.73% w/v (0.18 mol)], obtained from red seaweed (*Kappaphycus alvarezii*, obtained from Mandapam, Tamilnadu), was reacted with 23.92 gm (6% w/v; 0.16 mol) of L-tartaric acid & 4.65 gm of magnesium hydroxide (0.08 mol) under stirring for 20 hrs at 25±1 °C. The final pH was 2.78. Upon filtration of the resultant slurry, 350 mL of filtrate [K=0.28% w/v; tartaric acid: 0.72% w/v] & potassium bitartrate (26 gm; 88% isolated yield).

Examples 2 to 4 teach us that recovery of potassium bitartrate from SEL and *Kappaphycus alvarezii* seaweed sap at room temperature is much more efficient than with sea bittern (K~1.7% w/v) (≥88% vs. 56%), other conditions being similar.

Example 5

94 gm pure potassium DL-bitartrate [K=20% (0.48 mol)] was reacted with 24.71 gm (0.26 mol) of magnesium chloride & 14.6 gm of magnesium hydroxide (0.26 mol), in 150 ml water, under stirring for 17 hrs at 25±1 °C. The final pH was 5.0. Upon filtration of the resultant slurry, 86 mL of filtrate [K=11.24% w/v (0.25 mol)] & wet solid was obtained which was washed with 100 mL water to obtain 100 mL of wash liquor [K=7.58% w/v (0.19 mol)] and 154 gm of wet magnesium tartrate [K: 0.46% (0.02 mol)].

Example 6

94 gm of the dry solid comprising mainly potassium L-bitartrate obtained in Example 2, was treated with 23.68 gm (0.25 mol) of magnesium chloride & 14.6 gm of magnesium hydroxide (0.26 mol), in 150 ml water, under stirring, for 17 hrs at 25±1 °C. The final pH was 8.2. Upon filtration of the resultant slurry, 132 mL of filtrate [K=12% w/v (0.41 mol); Na=0.26% w/v (0.015 mol); tartaric acid=1.48% w/v; (0.013 mol)] & a wet solid was obtained, which was washed with 100 mL water to obtain 102 mL of wash liquor [K=4.4% w/v (0.12 mol)] and 133 g of washed wet solid containing 0.83% (w/v) K (0.03 mol) and 7.66% (w/v) Mg (0.42 mol).

Example 5 & 6 above teach us the method of recovery of a near saturated solution of potassium chloride from potassium bitartrate with co-generation of solid magnesium tartrate. These examples also teach us that magnesium L-tartrate gives higher recovery of filtrate than magnesium DL-tartrate and, consequently, the yield of KCl in concentrated form is higher with the former.

Example 7

406 mL of SEL [K=4.83% w/v (0.5 mol), Na=5.7% w/v (1.01 mol)] was reacted with 45.2 mL (0.45 mol) of hydrochloric acid & 130 gm of magnesium L-tartrate [Mg=7.66%, (0.41 mol)] from Example 4 under stirring for 41 hrs at 25±1 °C. The final pH was 1.35. Upon filtration of the resultant slurry, 465 mL of filtrate [K=0.61% w/v (0.07 mol); tartaric acid=1.42% w/v (0.044 mol)] & a wet solid was obtained, which was washed with 50 mL water & dried to produce 74 gm of potassium L-bitartrate [K=21.20% (0.40 mol); Na=0.17% (0.0055 mol); tartaric acid=73.8% (0.36 mol)].

Example 7 teaches us the method of recycling magnesium tartrate in a fresh lot of SEL through use of hydrochloric acid for regeneration of bitartrate and consequent precipitation of potassium bitartrate from SEL. The yield of potassium bitartrate from magnesium tartrate is computed to be 88% which is the same as the yield obtained in Example 2.

Example 8

0.3 L of a potassium depleted bittern containing 1.63% (w/v) residual tartaric acid was reacted with 2.4 gm (0.024 mol) calcium carbonate (purity: 100%) & 1.2 gm (0.0.007 mol) gypsum, under stirring for 1 hr at 25±1 °C. The residual tartaric acid in the liquor decreased to 0.086% (w/v) with concomitant formation of calcium tartrate.

0.1 L of the bittern depleted in tartaric acid was further reacted with 0.5 gm (0.0035 mol) calcium chloride (purity: 100%) & 10 ml of water, under stirring for 1 hr at 25±1 °C. Upon filtration of the resultant slurry, the tartaric acid content in the filtrate was further reduced to 268 ppm.

In similar manner, residual tartaric acid in potassium depleted SEL of Examples 1 and 2, and in KCl solution of Examples 4 and 5, can be recovered in the form of highly insoluble calcium tartrate and the tartaric acid can be regenerated there from following known prior art.

ADVANTAGES OF THE INVENTION

The present invention provides a safe and efficient extraction process for the recovery of near saturated KCl solution, free of impurities, from schoenite end liquor (SEL), obtained from the decomposition of kainite mixed salt into schoenite as disclosed in the prior art, thereby eliminating the need for i) evaporation of intermediate process stream, i.e., SEL and ii) downstream processes for recovery of potassium chloride, viz., evaporite harvesting, carnallite decomposition, hot leaching of crude potash etc.

Main advantages of the present invention may be stated as follows:

i) Compared to dipicrylamine extractant used previously for KCl recovery from SEL, tartaric acid is a safe extractant. Tartaric acid and salts thereof were is in the racemic or optically active forms and preferably in the form of the L-isomer, which is affordably priced and, compared to the racemate, gave higher recovery of filtrate both during formation of potassium bitartrate and its subsequent decomposition to release KCl in solution.

ii) Whereas complete decomposition of the potassium salt of dipicrylamine in the KCl forming process was difficult, and required a second treatment with nitric acid, this was not the case in the present system.

iii) Whereas recovery of potassium bitartrate was relatively low for bittern systems, it was remarkably efficient for the compositions of interest, namely schoenite end liquor (SEL) and seaweed sap, especially with L-tartaric acid.

iv) The core steps of the process, namely formation of potassium bitartrate and decomposition of the same, with regeneration of the extractant, can be performed under ambient conditions.

v) Chemicals such as HCl, magnesium hydroxide and magnesium chloride required in the process can all be obtained as part of the process.

vi) By dispensing with the need of fractional crystallization as the means of recovery of KCl from SEL, the entire process of producing sulphate of potash from kainite mixed salt can be performed through in-plant operations.

vii) Losses of tartaric acid during recovery can be eliminated by taking advantage of the low solubility of calcium tartrate and subsequent recovery of tartaric acid from it through known process.

viii) When seaweed sap which contains KCl is used, the process of the invention enables its concentration to be enhanced to saturation levels without requirement of thermal energy.

ix) The invention allows easy access to other important salts of potassium.

We claim:

1. A safe and efficient extraction process for recovery of a solution of potassium chloride, free of impurities, wherein said process comprises the steps of:
   i. providing a) a schoenite end liquor containing 4.0-5.5% w/v $K^+$ obtained from decomposition of kainite mixed salt into schoenite, b) seaweed sap from *Kappaphycus alvarezi* containing 3.0-4.5% w/v potassium chloride, or c) sea bittern having 3.25% w/v potassium chloride;
   ii. treating the schoenite end liquor, the seaweed sap, or the sea bittern obtained in step (i) with tartaric acid or a salt thereof and $Mg(OH)_2$, to obtain precipitated potassium bi-tartrate and a potassium depleted residue, wherein the tartaric acid or a salt thereof is in a sub-stoichiometric amount, and a molar ratio of the tartaric acid or a salt thereof to the $Mg(OH)_2$ is 2:1;
   iii. separating out the precipitated potassium bi-tartrate obtained in step (ii), and washing the precipitated potassium bi-tartrate obtained in step (ii) after separation with water to generate washings and washed potassium bi-tartrate;
   iv. adding the washings obtained in step (iii) into the potassium-depleted residue obtained in step (ii);
   v. treating the washed potassium bi-tartrate obtained in step (iii) with a stoichiometric amount of $MgCl_2$ and a stoichiometric amount of $Mg(OH)_2$ to convert the washed potassium bi-tartrate to magnesium tartrate while generating a potassium chloride solution;
   vi. separating the magnesium tartrate obtained in step (v) from the potassium chloride solution obtained in step (v), washing the magnesium tartrate after separation to give washings and washed magnesium tartrate;
   vii. treating the K-depleted residue obtained in step (iv) and the potassium chloride solution obtained in step (vi) with calcium carbonate and calcium chloride to precipitate out residual tartaric acid in a form of insoluble calcium tartrate;
   viii. adding the washed magnesium tartrate of step (vi) into a second schoenite end liquor along with a stoichiometric amount of aqueous HCl to precipitate out potassium bi-tartrate;
   ix. adding the potassium bi-tartrate from step (viii) into the washings of step (vi) and an additional amount of water followed by treating with a stoichiometric amounts of $MgCl_2$ and a stoichiometric amount of $Mg(OH)_2$ to precipitate out magnesium tartrate and obtaining a solution of Potassium chloride followed by regenerating tartaric acid from calcium tartrate obtained in step (vii).

2. The process as claimed in claim 1, wherein in step (ii) the tartaric acid or a salt thereof is in DL, D, or L form.

3. The process as claimed in claim 2, wherein recovery of potassium bi-tartrate is 85-95 mol % with respect to L-tartaric acid or a salt thereof and magnesium L-tartrate used in steps (ii) and (viii), respectively.

4. The process as claimed in claim 2, wherein the washings of magnesium tartrate obtained in step (vi), contained 7-9% KCl in case of L-tartaric acid and 14-16% KCl in case of DL tartaric acid.

5. The process as claimed in claim 2, wherein the tartaric acid or a salt thereof is L-tartaric acid or a salt thereof.

6. The process as claimed in claim 5, wherein amounts of L-tartaric acid and magnesium L-tartrate in steps (ii) and (viii), respectively, are in the range of 85-95 mol % of the amount of K+ in the schoenite end liquor, the seaweed sap, or the sea bittern.

7. The process as claimed in claim 1, wherein in step (ii), the schoenite end liquor, the seaweed sap, or the sea bittern is treated with tartaric acid and $Mg(OH)_2$, at a temperature of 20 to 35° C.

8. The process as claimed in claim 1, wherein in step (i), seaweed sap from *Kappaphycus alvarezi* containing 3.0-4.5% w/v potassium chloride is used.

9. The process as claimed in claim 1, wherein in step (i), sea bittern having 3.25% w/v potassium chloride is used.

10. The process as claimed in claim 9, wherein L-tartaric acid or a salt thereof is used in step (ii), and recovery of potassium L-bitartrate from sea bittern having 3.25% w/v KCl is 54-58 mol %.

11. The process as claimed in claim 1, wherein in step (vii) the residual tartaric acid is reduced to 200-400 ppm.

12. The process as claimed in claim 1, wherein $Mg(OH)_2$ required in the process of steps (ii) and (v) is generated as part of an integrated processes for sulphate of potash recovery from kainite mixed salt.

13. The process as claimed in claim 1, wherein the calcium carbonate in step (vii) is obtained from an integrated production of sulphate of potash and ammonium sulphate from kainite mixed salt.

14. The process as claimed in claim 1, wherein the potassium chloride solution of step (v) produces sulphate of potash on reaction with schoenite.

15. The process as claimed in claim 1, wherein recovery of magnesium tartrate obtained in step (vi) with respect to potassium bi-tartrate is 85-95 mol %.

\* \* \* \* \*